United States Patent
Nara et al.

(10) Patent No.: US 6,815,975 B2
(45) Date of Patent: Nov. 9, 2004

(54) INSPECTION METHOD AND INSPECTION DEVICE FOR ACTIVE MATRIX SUBSTRATE, INSPECTION PROGRAM USED THEREFOR, AND INFORMATION STORAGE MEDIUM

(75) Inventors: Shoji Nara, Yokohama (JP); Hui Jiang, Yokohama (JP); Wataru Yamamoto, Yokohama (JP)

(73) Assignee: Wintest Corporation (JP)

( * ) Notice: Subject to any disclaimer, the term of this patent is extended or adjusted under 35 U.S.C. 154(b) by 0 days.

(21) Appl. No.: 10/441,951

(22) Filed: May 20, 2003

(65) Prior Publication Data
US 2004/0008053 A1 Jan. 15, 2004

(30) Foreign Application Priority Data
May 21, 2002 (JP) ........................ 2002-146323

(51) Int. Cl.[7] .............................................. G01R 31/00
(52) U.S. Cl. ........................................................ 324/770
(58) Field of Search .................... 324/770, 753, 324/763–765, 768–769, 158.1; 345/3, 50, 87, 98, 100

(56) References Cited

U.S. PATENT DOCUMENTS 6,281,700 B1 * 8/2001 Matsueda ................ 324/770
6,590,411 B2 * 7/2003 Lee ......................... 324/770
6,630,840 B2 * 10/2003 Tomita .................... 324/765
6,697,057 B2 * 2/2004 Koyama et al. ......... 345/204
2002/0167472 A1    11/2002 Jinno
2003/0187597 A1    10/2003 Taguchi

FOREIGN PATENT DOCUMENTS

| JP | 06082817 | 3/1994 |
|---|---|---|
| JP | 07104712 | 4/1995 |
| JP | 07199220 | 8/1995 |
| JP | 10-321367 | 12/1998 |
| JP | 2000-348861 | 12/2000 |
| JP | 2002-032035 | 1/2002 |
| JP | 2003-295790 | 10/2003 |
| RU | 0 525 675 A2 | 7/1992 |

* cited by examiner

*Primary Examiner*—Minh N. Tang
(74) *Attorney, Agent, or Firm*—Harness, Dickey & Pierce, P.L.C.

(57) ABSTRACT

An inspection method and device are provided. The inspection method includes charging a parasitic capacitor between the gate and the drain of an operating transistor by supplying a potential from an inspection device, measuring discharge current from the parasitic capacitor by using the inspection device by discharging the parasitic capacitor, and determining whether or not a defect exists in each of a plurality of pixels by using the inspection device based on a value of the discharge current.

28 Claims, 7 Drawing Sheets

INSPECTION METHOD AND INSPECTION DEVICE FOR ACTIVE MATRIX SUBSTRATE, INSPECTION PROGRAM USED THEREFOR, AND INFORMATION STORAGE MEDIUM

Japanese Patent Application No. 2002-146323 filed on May 21, 2002, is hereby incorporated by reference in its entirety.

BACKGROUND OF THE INVENTION

The present invention relates to an inspection method and an inspection device for an active matrix substrate used for an organic EL display device and the like, and an inspection program used therefor and an information storage medium.

In recent years, a display device in which self-emitting organic EL elements are arranged in the shape of a matrix array has been extensively developed.

Defect inspection of this type of organic EL display device is carried out before shipment from the factory after forming an organic EL film between an active matrix substrate and a common substrate and assembling all peripheral parts.

A technique of inspecting a display screen by visual inspection by driving the organic EL display device has been known. However, in the case of visual inspection, variation of inspection accuracy easily occurs depending on the condition of the inspector or individual variation. Moreover, it is impossible to determine whether the display defect is caused by an interconnect defect or whether the defect pixel is a dark spot. Furthermore, it is impossible to determine whether luminance nonuniformity of the screen is caused by a defect in an organic EL film, a defect in a drive section, or current leakage from interconnects. Therefore, it is necessary to check the cause of defects for a display device which is determined to be defective after inspection. However, since the display device is manufactured in a plurality of manufacturing steps, the cause of defects may be superimposed between each step. Therefore, data on occurrence of defects cannot be rapidly fed back to the manufacturing steps.

There has been proposed automation of inspection for an organic EL display device (Japanese Patent Application Laid-open No. 10-321367 and Japanese Patent Application Laid-open No. 2000-348861). Japanese Patent Application Laid-open No. 10-321367 discloses a method of evaluating organic EL elements by measuring leakage current flowing through the organic EL elements when applying a reverse bias voltage. In this method, it is necessary to apply a reverse bias voltage to the organic EL elements while suspending display drive which causes constant current to flow through the organic EL elements. Japanese Patent Application Laid-open No. 2000-348861 points out the possibility in which true drive characteristics may not be evaluated by the method disclosed in Japanese Patent Application Laid-open No. 10-321367 due to influence of drive interruption, and proposes inspecting organic EL elements by superimposing an inspection signal during driving in which a forward bias voltage is applied to the organic EL elements. In this method, the organic EL elements are evaluated based on changes in drive voltage and drive current when superimposing the inspection signal.

However, since the inspection is performed in a finished product state in these applications, time and materials used to manufacture the product are lost if defects are detected.

BRIEF SUMMARY OF THE INVENTION

The present invention may provide an inspection method and an inspection device for an active matrix substrate capable of inspecting dot defects, line defects, or luminance defects in the stage of the active matrix substrate, and an inspection program used therefor and an information storage medium.

An inspection method for an active matrix substrate according to a first aspect of the present invention comprises:

a first step of providing an active matrix substrate including a plurality of signal lines, a plurality of scanning lines, a plurality of voltage supply lines, and a plurality of pixels, each of the plurality of pixels being connected with one of the signal lines, one of the scanning lines, and one of the voltage supply lines, each of the plurality of pixels including a pixel select transistor connected with the one signal line and the one scanning line and an operating transistor, a gate of the operating transistor being connected with the pixel select transistor, one of a source and a drain of the operating transistor being connected with the one voltage supply line, and the other of the source and the drain of the operating transistor being in an open state;

a second step of charging a parasitic capacitor between the gate of the operating transistor and the one voltage supply line by supplying a potential from an inspection device;

a third step of measuring discharge current by using the inspection device when discharging the parasitic capacitor; and a fourth step of determining whether or not a defect exists in each of the plurality of pixels by using the inspection device based on a value of the discharge current.

In the first aspect of the present invention, a voltage is applied between the gate of the operating transistor and the one voltage supply line. This enables the parasitic capacitor between the gate of the operating transistor and the one voltage supply line to be charged even if the source or the drain which is not connected with the one voltage supply line is in an open state. The parasitic capacitor cannot be charged if a defect, such as a breakage of the one voltage supply line or a breakage between the gate of the operating transistor and the one voltage supply line, exists. Therefore, the above defect can be detected by charging the parasitic capacitor and monitoring current when discharging the parasitic capacitor. Since a voltage cannot be normally applied between the gate of the operating transistor and the one voltage supply line in the case where the voltage supply line and the like are short-circuited, the short-circuit can be detected as a defect by monitoring current during discharging. Moreover, a luminance nonuniformity defect caused by a difference in the parasitic capacitors between the pixels can also be detected.

Each of the plurality of pixels may further include a storage capacitor connected with the gate of the operating transistor. In this case, an influence of the storage capacitor may be canceled in the second step and the third step. This is because current must be measured depending only on the parasitic capacitor. The influence of the storage capacitor may be canceled by setting a potential difference between opposite ends of the storage capacitor to be substantially the same in the second step and the third step. This prevents the storage capacitor from being charged and discharged.

A range of capacitance values of the parasitic capacitor between the gate of the operating transistor and the one voltage supply line may have a high-saturation region, a low-saturation region, and a transition region between the high-saturation region and the low-saturation region in which a capacitance value changes depending on an applied voltage. In this case, a voltage may be applied between the gate of the operating transistor and the one voltage supply line in at least one of the second step and the third step, so that a capacitance value of the parasitic capacitor between the gate of the operating transistor and the one voltage supply line is within the high-saturation region.

The amount of charge to be stored in the parasitic capacitor is increased as the capacitance value of the parasitic capacitor is increased during charging, whereby a large amount of discharge current can be obtained. Even if the capacitance value of the parasitic capacitor Cdgo is small during charging, since current flows until the parasitic capacitor is in the equilibrium state if the capacitance value of the parasitic capacitor Cdgo is large during discharging, whereby a large amount of discharge current can also be obtained. This enables a signal/noise ratio (S/N) of monitoring current to be secured sufficiently.

In the first aspect of the present invention, a set of steps consisting of the second to fourth steps may be performed a plurality of times while changing a voltage applied between the gate of the operating transistor and the one voltage supply line.

Luminance nonuniformity of the pixels may be caused by characteristics of the operating transistor (for example, variation of voltage-dependent characteristics of the parasitic capacitor between the gate and the drain). There may be a case where luminance nonuniformity is not observed by visual inspection in an early stage even if the characteristics of the transistors vary. However, a luminance nonuniformity defect occurs with the elapse of time in such a case. The "luminance nonuniformity" used herein refers to "distributions of transistors having different characteristics".

There may be a case where voltage-dependent variation of the parasitic capacitors cannot be detected by setting a voltage in the high-saturation region. Therefore, it is desirable to apply voltages at a plurality of points especially in the transition region and allow the parasitic capacitors to be charged and discharged at each of the points in order to measure voltage-dependent variation of the parasitic capacitors.

In this case, a luminance nonuniformity defect may be detected by measuring discharge current at a point at which the capacitance value of the parasitic capacitor is in the high-saturation region in the initial performance of the set, and measuring discharge current at a point at which the capacitance value of the parasitic capacitor is in the transition region after the initial performance. In this case, a pixel which is determined to be defective in the initial performance may not be determined after the initial performance. It is ideal to perform the charging step, the sensing step, and the determining step after the initial performance only for the pixels determined to be normal in the initial performance. However, in the case where the pixels are sequentially driven according to a fixed procedure, only the determining step for the defective pixel may be omitted.

An inspection method for an active matrix substrate according to a second aspect of the present invention comprises:

a first step of providing an active matrix substrate including a plurality of signal lines, a plurality of scanning lines, a plurality of voltage supply lines, and a plurality of pixels, each of the plurality of pixels being connected with one of the signal lines, one of the scanning lines, and one of the voltage supply lines, each of the plurality of pixels including a pixel select transistor connected with the one signal line and the one scanning line, an operating transistor, and a storage capacitor, a gate of the operating transistor being connected with the storage capacitor and the pixel select transistor, one of a source and a drain of the operating transistor being connected with the one voltage supply line, and the other of the source and the drain of the operating transistor being in an open state;

a second step of charging the storage capacitor by supplying a potential from an inspection device;

a third step of measuring discharge current from the storage capacitor by using the inspection device when discharging the storage capacitor; and a fourth step of determining whether or not a defect exists in each of the plurality of pixels by using the inspection device based on a value of the discharge current, wherein an influence of a parasitic capacitor between the gate of the operating transistor and the one voltage supply line is canceled in the second step and the third step.

According to the second aspect of the present invention, the storage capacitor can be charged and discharged in a state in which the influence of the parasitic capacitor between the gate of the operating transistor and the one voltage supply line is canceled. In this case, since current is not discharged normally if a defect exists in the charge/discharge path to the storage capacitor, such as the case where a defect exists in the pixel select transistor, a pixel defect can be detected. In this case, since the influence of the parasitic capacitor between the gate of the operating transistor and the one voltage supply line is canceled, discharge current can be measured without consideration of the presence of the operating transistor. Therefore, if a pixel is determined to be defective by the inspection method of the second aspect of the present invention, it is determined a the pixel defect exists in a pixel area other than the operating transistor. Therefore, whether or not a defect is caused by the operating transistor can be determined by performing the inspection method according to the second aspect of the present invention for a pixel which is determined to be defective by the inspection method according to the first aspect of the present invention. In the case where the pixels are sequentially driven according to a fixed procedure, only the determining step in the inspection method according to the second aspect of the present invention may be omitted for pixels which are determined to be normal by the inspection method according to the first aspect of the present invention.

The influence of the parasitic capacitor of the operating transistor may be canceled by setting a potential difference between the gate of the operating transistor and the one voltage supply line to be substantially the same in the second step and the third step. A range of capacitance values of the parasitic capacitor between the gate of the operating transistor and the one voltage supply line may have a high-saturation region, a low-saturation region, and a transition region between the high-saturation region and the low-saturation region in which a capacitance value changes depending on an applied voltage. Therefore, a voltage may be applied between the gate of the operating transistor and the one voltage supply line in the second step and the third step, so that a capacitance value of the parasitic capacitor between the gate of the operating transistor and the one voltage supply line is within the low-saturation region. This enables the parasitic capacitor to be substantially ignored.

The sequential pixel drive performed in the first aspect and the second aspect of the present invention is the same as a display drive method for an active matrix display. According to this display drive method, a charge operation may be performed for pixels arranged in line among the plurality of pixels by sequentially setting the scanning lines at an active potential in the second step (first frame), the pixels arranged in line being connected with each of the scanning lines, and when all the plurality of pixels have been charged, a discharge operation may be performed for the pixels arranged in line connected with each of the scanning lines by sequentially setting the scanning lines at the active potential in the third step (second frame). In the case of an interlace driving, the charge operation is performed for all the pixels in odd-numbered and even-numbered rows by using first and second fields, and the discharge operation is performed for all the pixels by using third and fourth fields.

The pixels arranged in line may be driven by a line-at-a-time scanning or a point-at-a-time scanning. It is desirable to employ the point-at-a-time scanning since discharge current in the third step is obtained for each pixel instead of for each line as in the line-at-a-time scanning. In the point-at-a-time scanning, the pixels arranged in line may be driven by a point-at-a-time scanning by sequentially connecting the signal lines connected with the pixels arranged in line with the inspection device in the second step and the third step.

An object of inspection may be an active matrix substrate comprising a vertical driver circuit which selectively drives the scanning lines and a horizontal driver circuit which selectively drives the signal lines. In this case, the pixels are driven in the second step and the third step based on functions of the vertical driver circuit and the horizontal driver circuit.

An inspection device for an active matrix substrate according to a third aspect of the present invention inspects an active matrix substrate including a plurality of signal lines, a plurality of scanning lines, a plurality of voltage supply lines, and a plurality of pixels, each of the plurality of pixels being connected with one of the signal lines, one of the scanning lines, and one of the voltage supply lines, each of the plurality of pixels including a pixel select transistor connected with the one signal line and the one scanning line and an operating transistor, a gate of the operating transistor being connected with the pixel select transistor, one of a source and a drain of the operating transistor being connected with the one voltage supply line, and the other of the source and the drain of the operating transistor being in an open state, the inspection device comprising:

an inspection potential generating circuit which generates inspection potentials supplied to the scanning lines and the voltage supply lines;

a charge-sense circuit connected with the signal lines;

a timing signal generating circuit which generates a timing signal for driving the scanning lines, the signal lines, and the voltage supply lines; and a determining circuit which determines whether or not a defect exists in each of the plurality of pixels based on an output from the charge-sense circuit, wherein the inspection potential generating circuit and the charge-sense circuit supply potentials to charge a parasitic capacitor between the gate of the operating transistor and the one voltage supply line in a charging period, supply potentials to discharge the parasitic capacitor in a sensing period, and measure discharge current from the parasitic capacitor by using the charge-sense circuit in the sensing period.

An inspection device according to a fourth aspect of the present invention performs the inspection method according to the second aspect of the present invention by using the same hardware as the inspection device according to the third aspect of the present invention.

The inspection method according to the first or second aspect of the present invention can be appropriately performed by using the inspection device according to the third or fourth aspect of the present invention.

An inspection program according to a fifth or sixth aspect of the present invention makes a computer to perform a procedure for the inspection method according to the first or second aspect of the present invention.

A computer-readable information storage medium according to a seventh aspect of the present invention stores the inspection program according to the fifth or sixth aspect of the present invention.

DETAILED DESCRIPTION OF THE EMBODIMENT

An embodiment of the present invention is described below with reference to the drawings.

1. Active Matrix Substrate

Figure 1:
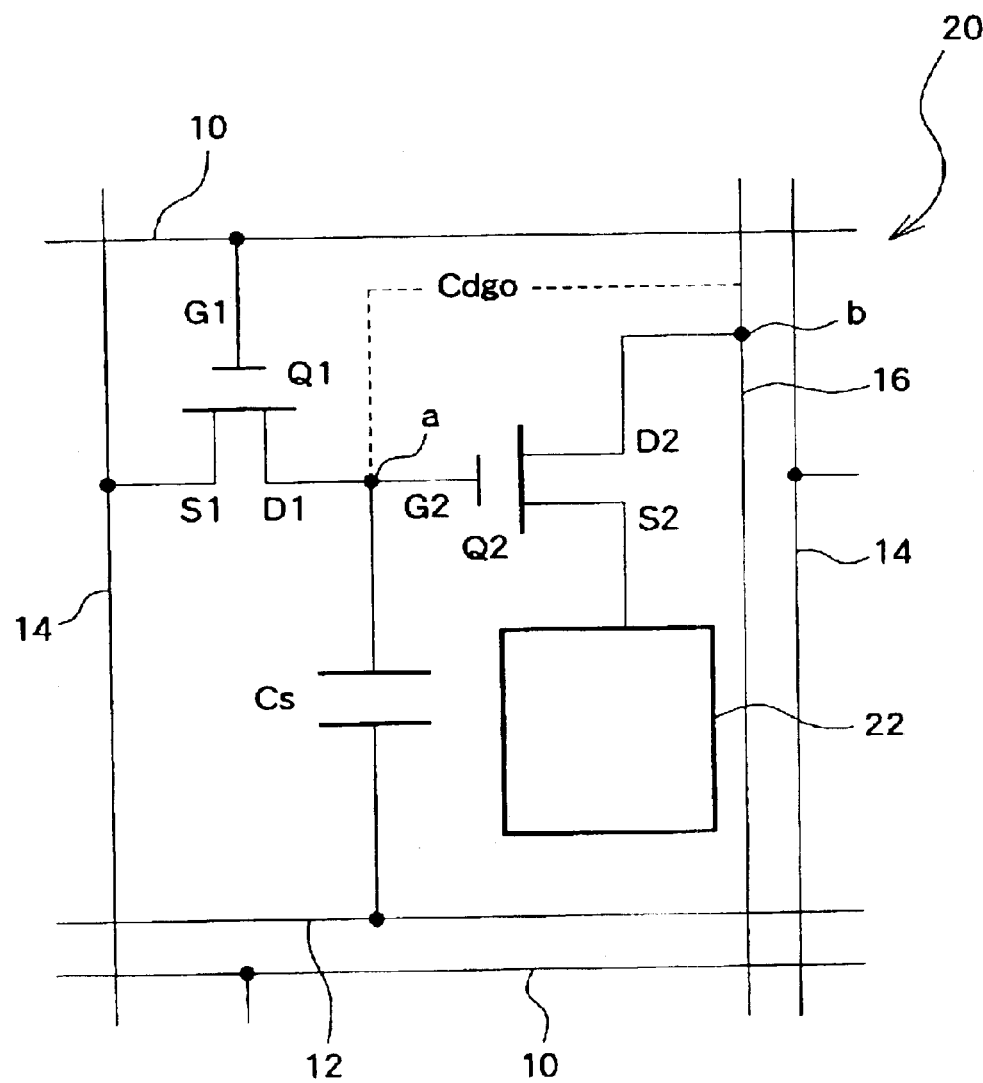
FIG. 1 is an equivalent circuit diagram of a pixel of an active matrix substrate according to one embodiment of the present invention.

FIG. 1 is an equivalent circuit diagram of an active matrix substrate used for an organic EL display device. In FIG. 1, a plurality of gate lines (scanning lines) 10 and a plurality of common lines 12 are provided on an insulating substrate along a row direction.

A plurality of signal lines (source lines) 14 and a plurality of voltage supply lines (anode lines) 16 are provided on the substrate along a column direction. A plurality of pixels 20, each of which is connected with one of the signal lines 14 and one of the scanning lines 10, is provided on the substrate. Each of the pixels 20 includes a pixel select transistor Q1 and an operating transistor Q2. A gate G1, a source S1, and a drain D1 of the pixel select transistor Q1 are respectively connected with the gate line 10, the source line 14, and a gate G2 of the operating transistor Q2. A drain D2 and a source S2 of the operating transistor Q2 are respectively connected with the anode line 16 and a pixel electrode 22. An area larger than that shown in FIG. 1 is secured for the pixel electrode 22 in practice.

In FIG. 1, the pixel select transistor Q1 and the operating transistor Q2 are formed by using N-type transistors. However, at least one of the pixel select transistor Q1 and the operating transistor Q2 may be formed by using a P-type transistor. In the case of using P-type transistors instead of N-type transistors, the source S1 and the drain D1 of the pixel select transistor Q1 are connected in reverse to the configuration shown in FIG. 1, and the source S2 and the drain D2 of the operating transistor Q2 are connected in reverse to the configuration shown in FIG. 1.

A storage capacitor Cs may be provided to each of the pixels 20, as shown in FIG. 1. A first electrode of the storage capacitor Cs is connected with a node a, specifically, the gate G2 of the operating transistor Q2 (drain D1 of the pixel transistor Q1). A second electrode of the storage capacitor Cs is connected with the common line 12.

The transistors Q1 and Q2 may be formed by using TFTs (thin film transistors) formed on a glass substrate, for example. However, the present invention is not limited thereto.

In the case of assembling an organic EL display device by using this active matrix substrate, an organic EL element is connected with the pixel electrode 22 which is connected with the source S2 of the operating transistor Q2. Therefore, since all the pixel electrodes 22 are in an open state in a stage of the active matrix substrate on which an organic EL film is not formed, current does not flow between the source and the drain of the operating transistor Q2. An active matrix substrate can be inspected by using an inspection method of the present embodiment even in a state in which the pixel electrode 22 is not formed. It suffices that the object of inspection is an active matrix substrate in which one of the source and the drain of the operating transistor Q2 is in an open state.

2. Correlation between Defects of Active Matrix Substrate and Defects Inspected by Visual Inspection The present embodiment enables defects shown in FIG. 2 which can be detected after assembling an organic EL display device by using the active matrix substrate shown in FIG. 1 to be detected in advance by inspection in a stage of the active matrix substrate.

Figure 2:
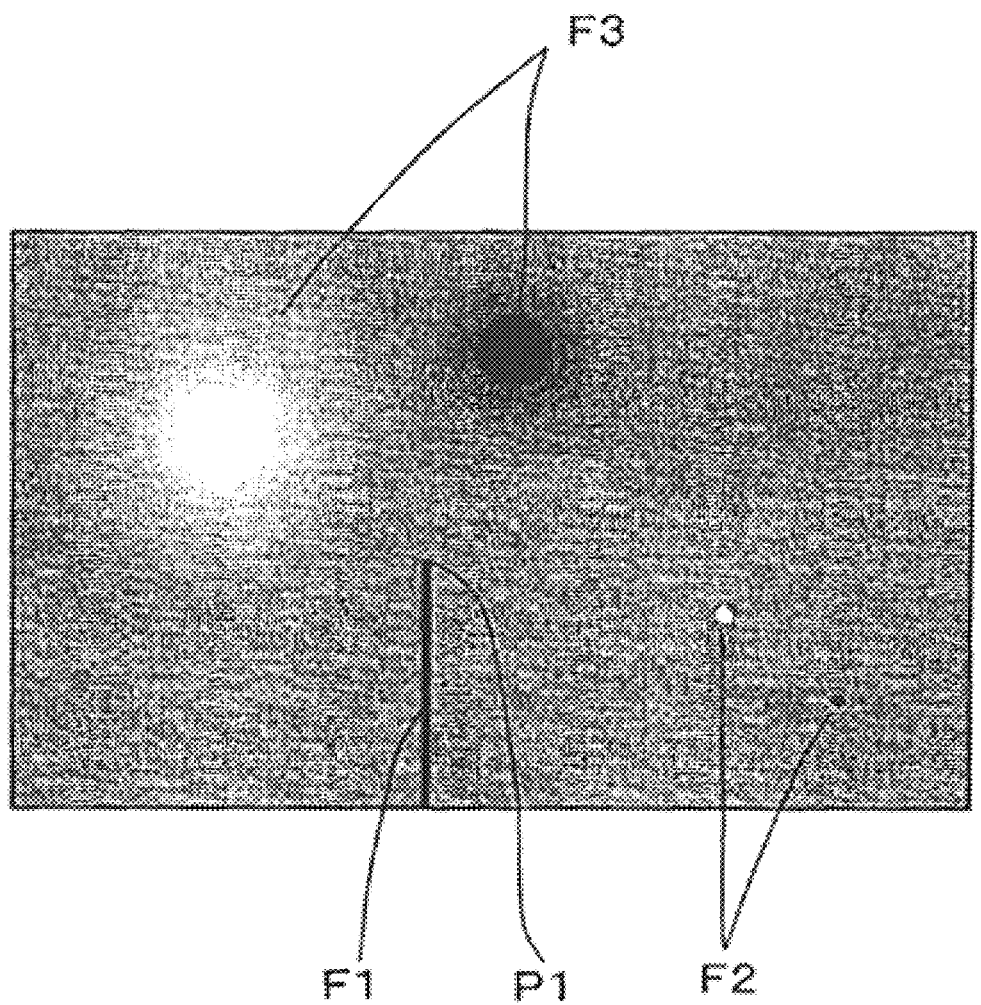
FIG. 2 is a schematic explanatory diagram illustrating a line defect, dot defect, and luminance nonuniformity in an organic EL display device formed by using the active matrix substrate shown in FIG. 1.

FIG. 2 shows an example of visual inspection which is enabled by driving an organic EL display device. In FIG. 2, normal pixels are indicated by half tone and occurrence of a line defect F1, dot defects F2, and luminance nonuniformity F3 is observed.

The cause of the line defect F1 is short-circuiting between lines, breakage, defect of the pixel select transistor, or the like. For example, the anode line 16 shown in FIG. 1 may break at a point P1. In the case where an anode voltage supply circuit is disposed on the upper side in FIG. 2, since voltage can be supplied to the anode line 16 before reaching the breakage point P1, current can be allowed to flow through EL elements of the pixels 20 connected with the anode line 16. However, current does not flow through EL elements of the pixels 20 connected with the anode line 16 disconnected from the anode voltage supply circuit at the breakage point P1, whereby the line defect F1 occurs along a vertical line.

The cause of the dot defects F2 shown in FIG. 2 is defects (open or short-circuiting) of the transistors in the pixels. For example, the operating transistors Q2 in the pixels 20 may be defective. If current flowing between the source and the drain of the operating transistor Q2 is not the current which allows the normal pixels to be displayed in half tone, a dot defect such as a luminous dot or a dark dot occurs.

The luminance nonuniformity shown in FIG. 2 may be caused by variation of characteristics of the operating transistors Q2 in each pixel 20. If the current characteristics differ between the operating transistors Q2, current flowing through organic EL elements varies. This phenomenon is recognized as the luminance nonuniformity F3 on the screen. The pattern of the luminance nonuniformity F3 depends on the positions of the operating transistors Q2 having different current characteristics. FIG. 2 shows an example of the pattern.

3. Principle of Defect Detection

Visual inspection shown in FIG. 2 cannot be carried out unless the organic EL display device is completed. In other words, since current cannot be caused to flow through organic EL elements in a stage of the active matrix substrate on which an organic EL film is not formed, visual inspection is impossible.

In the case of measuring current characteristics of the operating transistors Q2 which supply current to organic EL elements, it is necessary to contact each of a number of pixel electrodes 22 arranged at a fine pitch. However, this method is impossible in practice. It is also impossible to contact the source S2 of the operating transistor Q2 shown in FIG. 1 before the pixel electrode 22 is formed.

3-1 Measurement of Current Based on Parasitic Capacitor Cdgo between Gate and Drain of Operating Transistor Q2

The present inventors have directed attention to a parasitic capacitor Cdgo between the gate and the drain of the operating transistor Q2 shown in FIG. 1. The parasitic capacitor Cdgo can be charged by applying voltage between the gate and the drain of the operating transistor Q2 even if the source is in an open state. The parasitic capacitor Cdgo cannot be charged if defects occur due to breakage of the anode line 16 or breakage between the gate and the drain of the operating transistor Q2. Therefore, the breakage defects can be detected by charging the parasitic capacitor Cdgo and monitoring current when discharging the parasitic capacitor Cdgo. Since a normal voltage cannot be applied between the gate and the drain of the operating transistor Q2 in the case where the anode line 16 and the like are short-circuited, short-circuiting can be determined as a defect by monitoring current during discharging.

Defects which cause the line defect F1 and the dot defect F2 shown in FIG. 2 can be detected by the detection principle described above.

Figure 3:
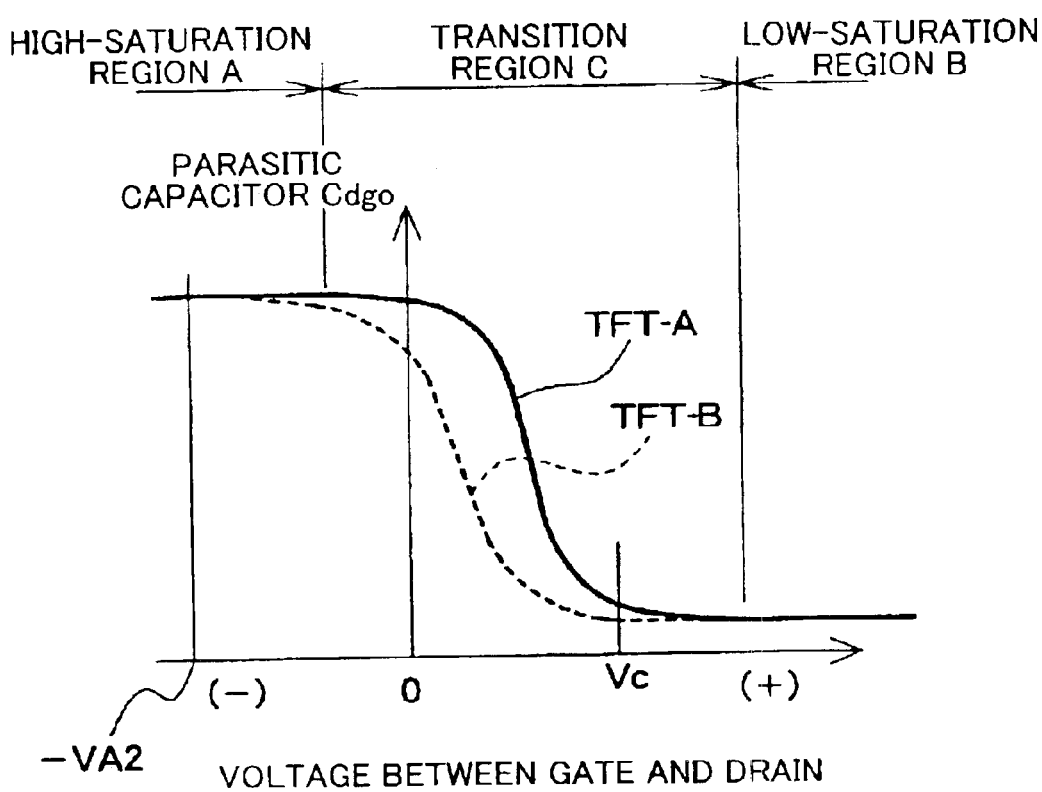
FIG. 3 is a characteristic diagram of a capacitance value of a parasitic capacitance Cdgo between a gate and a drain which is changed depending on a voltage applied between a gate and a drain of a TFT when forming an operating transistor provided in the pixel shown in FIG. 1 by using the TFT.

3-2 Utilization of High-Saturation Region of Applied-Voltage Dependent Parasitic Capacitor Cdgo FIG. 3 shows an example of characteristics of the parasitic capacitor Cdgo which are changed depending on voltage applied between the gate and the drain in the case of forming the operating transistor Q2 by using a TFT. As shown in FIG. 3, the parasitic capacitor Cdgo of the operating transistor Q2 has an applied-voltage dependence. As shown in FIG. 3, TFT-A indicated by a solid line has a high-saturation region A in which the parasitic capacitor Cdgo has a high saturation value irrespective of the applied voltage, a low-saturation region B in which the parasitic capacitor Cdgo has a low saturation value irrespective of the applied voltage, and a transition region C between the high-saturation region A and the low-saturation region B in which the parasitic capacitor Cdgo is changed depending on the applied voltage.

In the case of monitoring discharge current from the parasitic capacitor Cdgo, a signal/noise ratio (S/N) is increased as the capacitance value of the parasitic capacitor Cdgo is increased due to an increase in the amount of current, whereby inspection accuracy is increased.

This can be achieved by generating an applied voltage which causes the capacitance value of the parasitic capacitor Cdgo to be in the high-saturation region A (−VA2 shown in FIG. 3, for example) when at least either charging or discharging the parasitic capacitor Cdgo.

The amount of charge to be stored in the parasitic capacitor Cdgo is increased as the capacitance value of the parasitic capacitor Cdgo is increased during charging, whereby a large amount of discharge current can be obtained. Even if the capacitance value of the parasitic capacitor Cdgo is small during charging, current flows until the parasitic capacitor Cdgo is in an equilibrium state if the capacitance value of the parasitic capacitor Cdgo is large during discharging, whereby a large amount of discharge current can also be obtained. However, if the capacitance value of the parasitic capacitor Cdgo is small both during charging and during discharging, a large amount of discharge current cannot be obtained.

3-3 Measurement of Variation of Characteristics of Operating Transistors Q2

One of the causes of the luminance nonuniformity F3 shown in FIG. 2 is variation of characteristics of the operating transistors Q2. Variation of characteristics can be detected by measuring current based on variation of the parasitic capacitors Cdgo.

As shown in FIG. 3, voltage dependent characteristics of the parasitic capacitors Cdgo differ between TFT-A indicated by the solid line and TFT-B indicated by the dotted line in the transition region C. There may be a case where the difference between the two types of characteristics TFT-A and TFT-B cannot be detected by the voltage setting (−VA2 shown in FIG. 3, for example) which puts the parasitic capacitor Cdgo in the high-saturation region A.

Therefore, applied voltage is changed at a plurality of points between the voltage 0 and the voltage Vc in the transition region C, and current is monitored by discharging the parasitic capacitor Cdgo at each point. This enables variation of characteristics of the operating transistors Q2 to be determined. Therefore, defects which cause the luminance nonuniformity F3 shown in FIG. 2 can be detected from the monitoring results for the current. In the case where a majority of the pixels 20 are formed by using the operating transistors Q2 having the characteristic TFT-A shown in FIG. 3, the pixel 20 including the operating transistor Q2 having the characteristic TFT-B shown in FIG. 3 has luminance differing from the luminance of other pixels 20, thereby causing the luminance nonuniformity F3.

3-4 Cancellation of Influence of Storage Capacitor Cs during Measurement

According to the pixel configuration shown in FIG. 1, the storage capacitor Cs is connected with the gate G2 of the operating transistor Q2. Therefore, the storage capacitor Cs is also charged or discharged when charging or discharging the parasitic capacitor Cdgo of the operating transistor Q2. Provided that the capacitance of the storage capacitor Cs is c1 and the capacitance value of the parasitic capacitor Cdgo is c2, the relation between c2 and c1 is generally c2<<c1. The capacitance c2 is significantly smaller than the capacitance c1, such as c2<c1/10.

Therefore, discharge current from the storage capacitor Cs cannot be ignored when monitoring discharge current from the parasitic capacitor Cdgo of the operating transistor Q2, whereby the characteristics of the operating transistor Q2 cannot be detected.

Therefore, in the case where the pixel has the storage capacitor Cs, influence of the storage capacitor Cs may be canceled when charging or discharging the parasitic capacitor Cdgo of the operating transistor Q2. This can be achieved by setting the potential difference between opposite ends of the storage capacitor Cs to be substantially equal during charging and discharging when charging or discharging the parasitic capacitor Cdgo of the operating transistor Q2. This prevents the storage capacitor Cs from being charged or discharged, whereby the influence of the storage capacitor Cs can be canceled.

Figure 4:
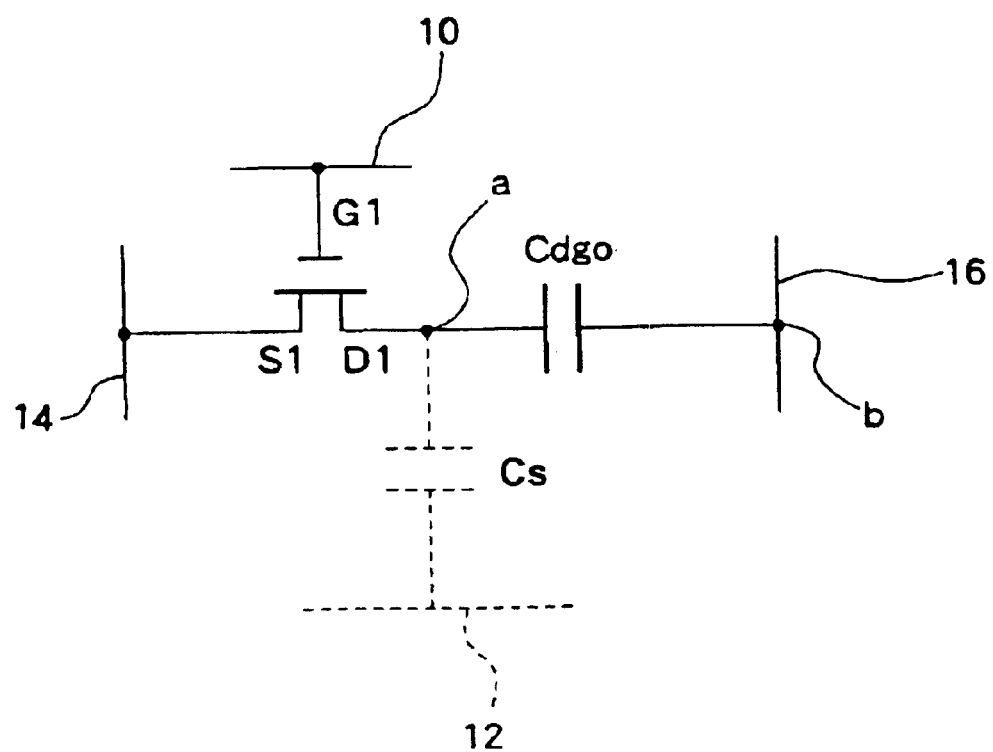
FIG. 4 is an equivalent circuit diagram of the pixel in a case where an effect of a storage capacitor shown in FIG. 1 is canceled.

FIG. 4 is an equivalent circuit diagram of the pixel 20 in the case where the influence of the storage capacitor Cs is canceled. In FIG. 4, only the pixel select transistor Q1 and the parasitic capacitor Cdgo of the operating transistor Q2 are present between the source line 12 and the anode line 16.

3-5 Measurement by Charging and Discharging of Storage Capacitor Cs (Cancellation of Influence of Parasitic Capacitor Cdgo)

Pixel defects may be measured by charging the storage capacitor Cs instead of the parasitic capacitor Cdgo during charging. Discharge current from the storage capacitor Cs may be measured during sensing. If the value of the discharge current is abnormal, it is determined that a defect occurs in the middle of a charging path to the storage capacitor Cs. In particular, a pixel which is abnormal when charging and discharging the parasitic capacitor Cdgo may be subjected to measurement by charging and discharging the storage capacitor Cs. If the pixel is also abnormal when charging and discharging the storage capacitor Cs, it is confirmed that an area other than the operating transistor Q2, such as the pixel select transistor Q1, is defective.

In this case, the charging step and the sensing step are carried out in a state in which the influence of the parasitic capacitor Cdgo is canceled. This aims at measuring discharge current in a state in which there is no influence of the operating transistor Q2. The influence of the parasitic capacitor Cdgo may be canceled by setting the potential difference between the gate and the drain of the operating transistor Q2 to be substantially equal during charging and sensing. A voltage which causes the parasitic capacitor Cdgo to be in the low-saturation region may be applied between the gate and the drain of the operating transistor Q2.

4. Inspection Device

Figure 5:
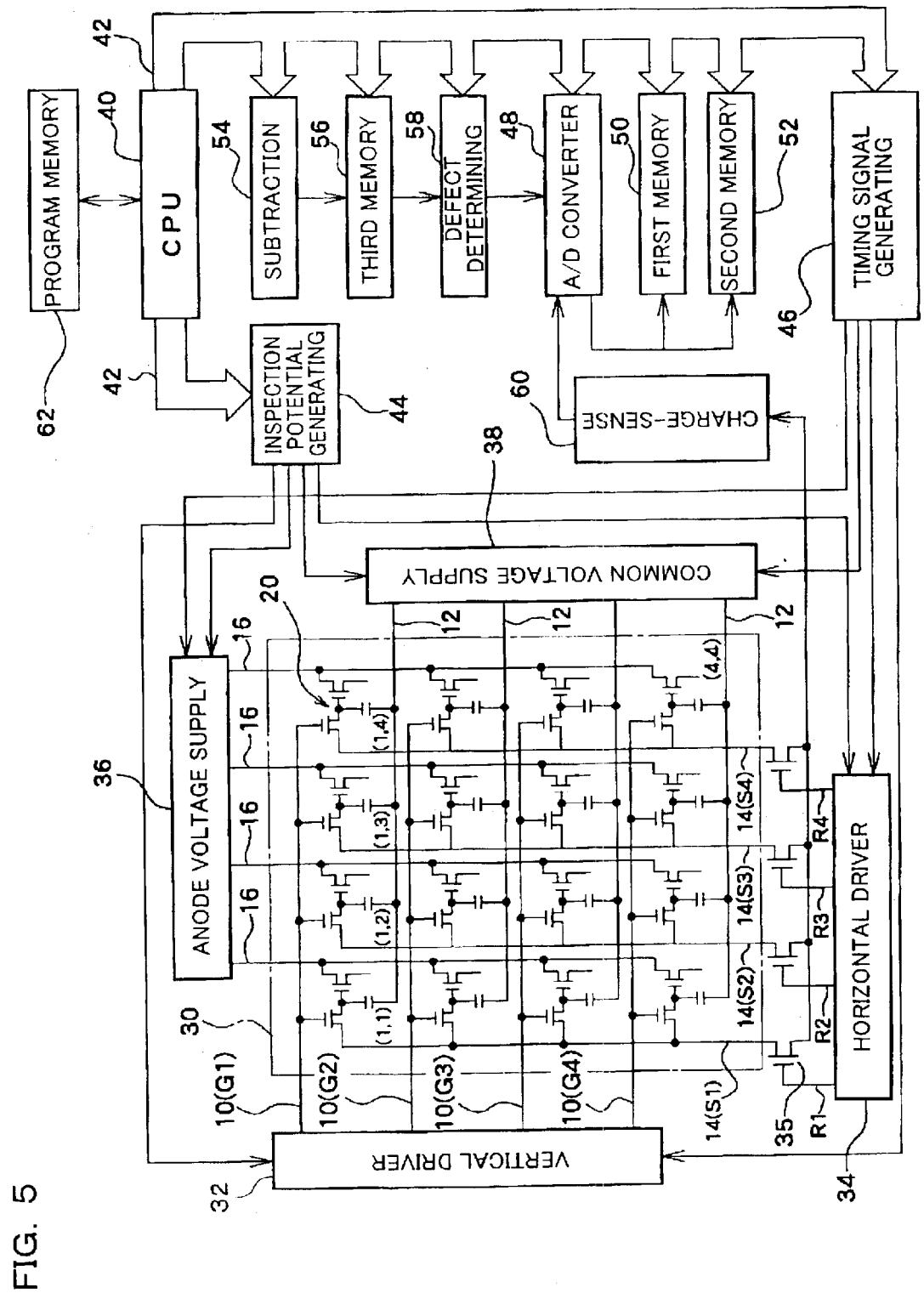
FIG. 5 is block diagram of an inspection device for an active matrix substrate according to one embodiment of the present invention.

FIG. 5 shows an active matrix substrate which is an object of inspection in the present embodiment, and an inspection device for the active matrix substrate. A number of pixels 20 shown in FIG. 1 are arranged in a pixel matrix array region 30 in the shape of a matrix array. A plurality of gate lines 10 of the pixel matrix array 30 is connected with a vertical driver circuit 32. A plurality of source lines 14 is connected with a horizontal driver circuit 34 through a plurality of column select gates 35. A plurality of anode lines 16 is connected with an anode voltage supply circuit 36. A plurality of common lines 12 is connected with a common voltage supply circuit 38. The vertical driver circuit 32, the horizontal driver circuit 34, the anode voltage supply circuit 36, and the common voltage supply circuit 38 may be formed on the active matrix substrate. In this case, it is unnecessary to provide the circuits 32 to 38 to the inspection device, and the circuits 32 to 38 formed on the active matrix substrate may be used for inspection. In FIG. 5, the number of gate lines 10 and source lines 14 in the pixel matrix array 30 is respectively four for convenience of description. Therefore, the pixel matrix array 30 has the 16 pixels 20 in total.

A central processing unit (CPU) 40 which manages inspection control is provided to the inspection device. An inspection potential generating circuit (inspection potential generating means) 44, a timing signal generating circuit (timing signal generating means) 46, and an A/D converter circuit 48, a first memory circuit 50, a second memory circuit 52, a subtraction circuit 54, a third memory circuit 56, and a defect determining circuit 58 which make up determining means are connected with a bus 42 of the CPU 40. A charge-sense circuit (charge-sense means) 60 is connected with a video terminal which is connected in common with the plurality of column select gates 35, and an analog signal sensed by the charge-sense circuit 60 is input to the A/D converter circuit 48.

A program memory 62 is connected with the CPU 40. The program memory 62 is an information storage medium which can be read by a computer including the CPU 40, in which an execution procedure for the inspection method described below is recorded. The program memory 62 may be made up of a hard disk, ROM, RAM, flexible disk, CD-ROM, or the like.

5. Specific Example of Inspection Method

Figure 6:
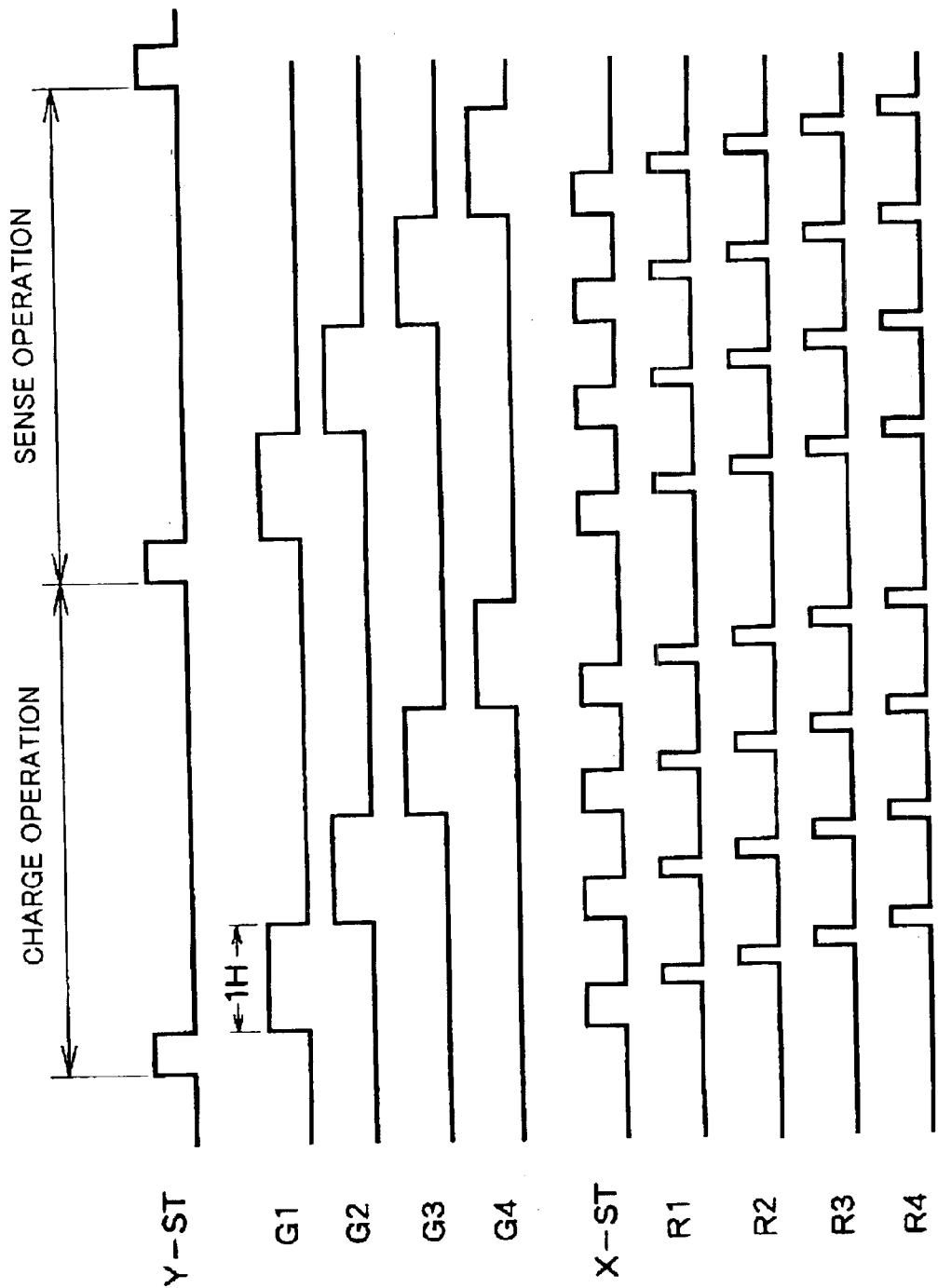
FIG. 6 is a timing chart illustrating a charge operation and a sense operation.

In the present embodiment, the parasitic capacitors Cdgo of the operating transistors Q2 in each pixel 20 are sequentially charged in a first frame, and current is sensed in a second frame by sequentially discharging the parasitic capacitors Cdgo of the operating transistors Q2 in each pixel 20, as shown in FIG. 6.

As shown in FIG. 6, scanning signals which are turned on only in one horizontal scanning period H are supplied to four gate lines G1 to G4 from the vertical driver circuit 32 based on a timing signal such as a Y start signal Y-ST (vertical synchronization signal) output from the timing signal generating circuit 46. This causes the four pixel select transistors Q1 in a first row to be turned on at the same time. The pixel select transistors Q1 in a second row to a fourth row are then sequentially selected in a row unit.

Horizontal scanning signals shown in FIG. 6 are supplied to four column select gate control lines R1 to R4 from the horizontal driver circuit 34 based on a timing signal such as an X start signal X-ST output from the timing signal generating circuit 46. This causes the four column select gates 35 to be sequentially turned on from the left for each row selection, whereby four source lines S1 to S4 are sequentially connected with the charge-sense circuit 60 from the left. This enables the pixels 20 in each row to be driven by a dot sequential method.

Voltage is supplied to four anode lines 16 from the anode voltage supply circuit 36 and voltage is supplied to four common lines 12 from the common voltage supply circuit 38 in the first frame and the second frame. A charge voltage is supplied to the four source lines 14 (S1 to S4) from the charge-sense circuit 60 through the column select gates 35 during the charge operation in the first frame. During the sense operation in the second frame, current flowing through the column select gates 35 from the four source lines 14 (S1 to S4) is input to the charge-sense circuit 60.

Voltage setting by the inspection potential generating circuit 44 or the charge-sense circuit 60 during charging in the first frame and during sensing in the second frame is shown in Table 1.

TABLE 1

|  | First frame (charge operation) | Second frame (sense operation) |
|---|---|---|
| Anode line | VA1 | VA2 (EX: VA2 = VA1) |
| Source line | VS1 | VS2 (EX: VS2 = 0) |
| Voltage between G2 and D2 | VS1–VA1 | VS2–VA2 (EX: <0) |
| Common line | VS1 | VS2 |
| Voltage applied to Cs | 0 | 0 |

During charging in the first frame, the pixel select transistors Q1 in the pixel 20 (1,1) to the pixel 20 (1,4) in the first row shown in FIG. 5 are turned on at the same time within one horizontal scanning period (1H) by the operation of the vertical driver circuit 32. The column select gates 35 connected with the column select gate lines R1, R2, R3, and R4 are sequentially turned on within one horizontal scanning period (1H) by the operation of the horizontal driver circuit 34.

Therefore, the pixel select transistor Q1 in the pixel 20 (1,1) is turned on in the first horizontal scanning period (1H), whereby the node a shown in FIG. 1 is set at a potential approximately equal to a potential VS1 of the source line S1 (lower than the potential VS1 for the voltage drop between the source and the drain of the transistor Q1) through the source line S1 from the charge-sense circuit 60 and the pixel select transistor Q1. The potential VS1 is also supplied to the common line 12 connected with the pixel 20 (1,1) by the common voltage setting circuit 38. Therefore, the potentials on opposite ends of the storage capacitor Cs in the pixel 20 (1,1) are approximately equal to VS1, whereby the potential difference between the opposite ends of the storage capacitor Cs is approximately 0.

The node b of the anode line 16 connected with the pixel 20 (1,1) is set at a potential VA1 by the operation of the anode voltage supply circuit 36. Therefore, a voltage (VS1–VA1) is applied between the gate G2 and the drain D2 of the operating transistor Q2 in the pixel 20 (1,1), whereby the parasitic capacitor Cdgo between the gate G2 and the drain D2 is charged based on the applied voltage (VS1–VA1).

The charge operation is also performed in the pixels 20 (1,2), (1,3), and (1,4) in the first row within this horizontal scanning period (1H).

The same charge operation is performed in the pixels 20 (2,1) to (2,4) in the second row in the next horizontal scanning period (1H) by the operations of the vertical driver circuit 32 and the horizontal driver circuit 34. Since the pixel select transistors Q1 are turned off in the pixels 20 (1,1) to (1,4) in the first row, the parasitic capacitors Cdgo in each pixel 20 are maintained in a charged state.

The charge operation is then performed in each pixel 20 in the third row and the fourth row in the same manner as described above, whereby the charge operation in the first frame is completed.

The sense operation is performed in the second frame. The pixels 20 are selected in the same manner as in the first frame. Voltage is supplied to the pixel 20 (1,1) from the charge-sense circuit 60 through the column select gate 35 and the source line S1, whereby the node a shown in FIG. 1 is set at a potential approximately equal to a potential VS2 of the source line 14 (S1), as shown in Table 1. The potential of the node b shown in FIG. 1 is equal to a potential VA2 of the anode line 16 shown in Table 1. Therefore, a voltage (VS2–VA2) is applied to the parasitic capacitor Cdgo.

The potential VS2 is also supplied to the common line 12 connected with the pixel 20 (1,1) by the common voltage setting circuit 38. Therefore, the potentials on opposite ends of the storage capacitor Cs in the pixel 20 (1,1) are approximately equal to VS2, whereby the potential difference between the opposite ends of the storage capacitor Cs is approximately 0 in the same manner as in charging.

The voltage VS2 of the source line 14 (S1) during sensing is set lower than the voltage during charging, such as 0 V. In this case, –VA2 is applied to the parasitic capacitor Cdgo during sensing. The applied voltage (–VA2) is a voltage which causes the capacitance value of the parasitic capacitor Cdgo to be set in the high-saturation region A, as shown in FIG. 2. Therefore, a comparatively large discharge current continues to flow through the source line 14 (S1) through the pixel select transistor Q1 during sensing until the parasitic capacitor Cdgo having a capacitance in the high-saturation region A is in an equilibrium state. Since the voltage applied to the storage capacitor Cs is almost constant during charging and sensing, charge and discharge do not occur in the storage capacitor Cs.

This enables the influence of the storage capacitor Cs to be canceled during charging and sensing. The characteristics of the parasitic capacitor Cdgo can be inspected in this manner by monitoring a comparatively large discharge current from the parasitic capacitor Cdgo during sensing. The discharge current from the parasitic capacitors Cdgo in all the pixels 20 can be monitored by performing the sense operation by selecting each pixel 20 in the same manner as in charging.

The discharge current from the parasitic capacitor Cdgo may be measured by applying various methods. The discharge current may be measured by using an ammeter. However, since it is unnecessary to measure the absolute value of current in the present embodiment, defects can be identified by merely comparing the parasitic capacitors Cdgo in each pixel 20 with a comparative value.

Therefore, the inspection device of the present embodiment has a configuration as shown in FIG. 5. In FIG. 5, current from each of the source lines 14 is input to the A/D converter circuit 48 through the charge-sense circuit 60, and converted into digital signals by the A/D converter circuit 48. Output of the A/D converter circuit 48 is stored in one of the first memory circuit 50 and the second memory circuit 52. A comparative value to be compared with the value stored in one of the first memory circuit 50 and the second memory circuit 52 is stored in the other of the first memory circuit 50 and the second memory circuit 52.

The comparative value may be either a reference value set in advance or a value detected for the next pixel 20. In the latter case, values sequentially detected for each pixel 20 are alternately stored in the first memory circuit 50 and the second memory circuit 52, and compared with the values stored the last time.

Information stored in the first and second memory circuits 50 and 52 is compared by the subtraction circuit 54 shown in FIG. 5, and the differential results for the information are stored in the third memory circuit 56. Specifically, the differential results are the difference between the values of the discharge current from each pixel 20 and the comparative value.

The defect determining circuit 58 determines whether or not a defect exists based on information stored in the third memory circuit 56. This enables the defects F1 to F3 shown in FIG. 2 to be determined before visual inspection in a stage of the active matrix substrate.

Figure 7:
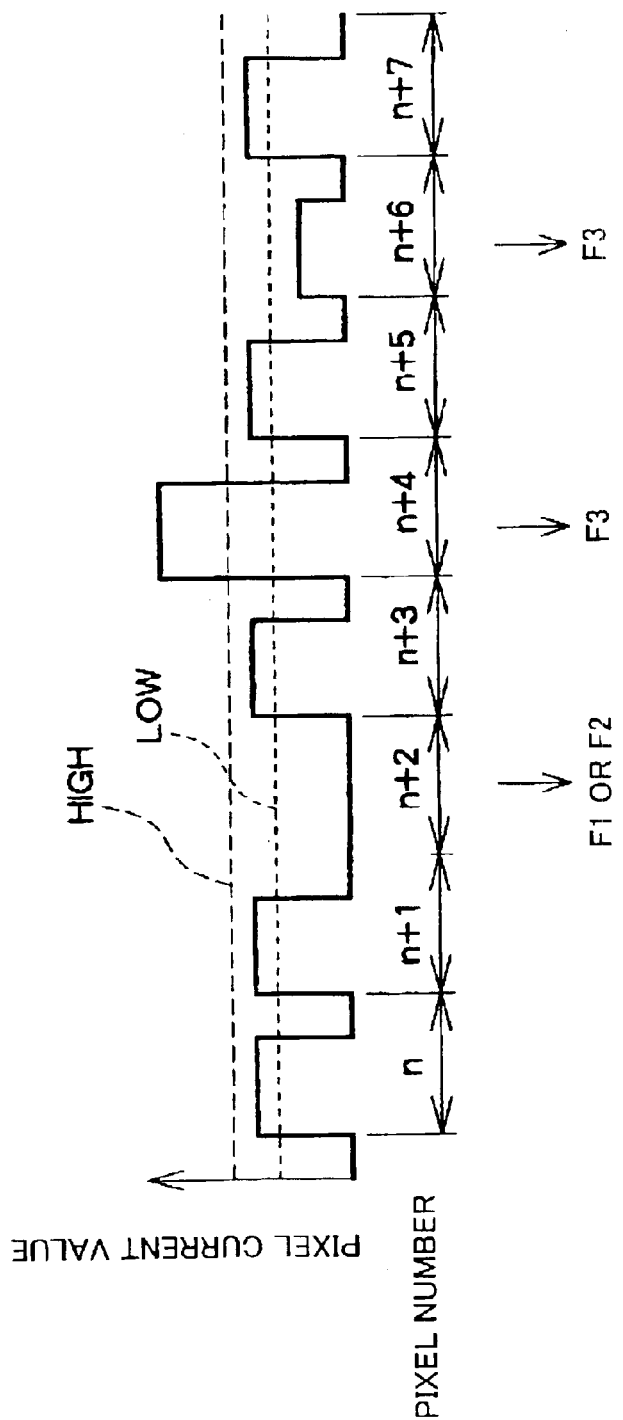
FIG. 7 is a schematic explanatory diagram illustrating an example of a defect determining operation.

FIG. 7 shows an example of the determining operation of the defect determining circuit 58. If the sequentially measured values of discharge current from the pixels 20 are within the allowable range between the upper limit and the lower limit in comparison with the comparative value, the pixels 20 are determined to be normal. Since the discharge current from the (n+2)th pixel 20 is 0, either the defect F1 or the defect F2 shown in FIG. 2 occurs. If the same defects continuously occur in the same column as the (n+2)th pixel 20, the defects can be determined as the defect F1. If the defect occurs only in the (n+2)th pixel 20, the defect can be determined as the dot defect F2. The luminance nonuniformity F3 occurs in the (n+4)th and (n+6)th pixels 20 of which the discharge current is not 0, but is out of the allowable range to a certain extent.

It is desirable to perform the inspection given below in the case of the luminance nonuniformity F3. The inspection given below may be performed separately from the above-described defect judgment inspection, or may be performed continuously with the above-described defect judgment inspection.

One of the causes of the luminance nonuniformity F3 is variation of characteristics of the parasitic capacitors Cdgo in each pixel 20 as indicated by the two types of characteristics TFT-A and TFT-B shown in FIG. 3. There may be a case where variation of characteristics cannot be measured in the high-saturation region A shown in FIG. 3. Variation of characteristics occurs significantly in the transition region C, as shown in FIG. 3. Therefore, the luminance nonuniformity F3 may be detected by applying several types of voltages in a voltage range in which the capacitance value of the parasitic capacitor Cdgo is in the transition region C, such as between 0 V and Vc shown in FIG. 3, to the parasitic capacitor Cdgo during at least either charging or sensing.

This enables determination of whether the parasitic capacitor Cdgo has either of the two types of characteristics TFT-A and TFT-B in the example shown FIG. 3. If a majority of pixels 20 in the pixel matrix array 30 have the characteristic TFT-A, luminance nonuniformity occurs in the pixel 20 having the characteristic TFT-B.

In the case of performing defect judgment inspection for luminance nonuniformity, it is desirable to repeatedly perform a set consisting of the charging step and the sensing step a plurality of times while changing the inspection voltage. The difference in characteristics of the parasitic capacitors Cdgo can be detected more clearly by measuring at a plurality of points.

The defect inspection step for dot defects and line defects may be performed in an initial performance of the set, and the defect inspection step for luminance nonuniformity may be performed after the initial performance. In this case, a pixel which is determined to be defective in the initial performance may not be determined after the initial performance. The charging step and the sensing step are also unnecessary for the defective pixel after the initial performance. However, in the case of performing the charging step and the sensing step based on the functions of the vertical and horizontal driver circuits 32 and 34, it is difficult to cause only a specific pixel to be charged and discharged. Therefore, the judgment step performed by the A/D converter circuit 48 and the like shown in FIG. 5 for the defective pixel may be omitted after the initial performance. This can be achieved by storing the judgment results for each pixel 20 in the initial performance in a memory (not shown), and performing the judgment step for only the pixels 20 which are determined to be normal in the initial performance based on information stored in the memory after the initial performance.

6. Pixel Defect Inspection of area other than Operating Transistor

Pixel defects may be measured by charging the storage capacitor Cs instead of the parasitic capacitor Cdgo. The storage capacitor Cs is charged by providing a potential difference between the node a and the common line 12 shown in FIG. 1 by allowing the pixel select transistor Q1 to be turned on. Discharge current from the storage capacitor Cs may be measured through the source line 14 during sensing by allowing the pixel select transistor Q1 to be turned on. If the value of the discharge current is abnormal, it is determined that a defect occurs in the middle of the charging path to the storage capacitor Cs. In particular, a pixel which is abnormal when charging and discharging the parasitic capacitor Cdgo may be subjected to measurement by charging and discharging the storage capacitor Cs. If the pixel is also abnormal when charging and discharging the storage capacitor Cs, it is confirmed that an area other than the operating transistor Q2 such as the pixel select transistor Q1 is defective.

In this case, the charging step and the sensing step are carried out in a state in which the influence of the parasitic capacitor Cdgo is canceled. This aims at measuring discharge current in a state in which there is no influence of the operating transistor Q2. The influence of the parasitic capacitor Cdgo may be canceled by setting the potential difference between the gate and the drain of the operating transistor Q2 (between the node a and the node b shown in FIG. 1) to be substantially equal during charging and sensing. A voltage which causes the parasitic capacitor Cdgo to be in the low-saturation region as shown in FIG. 3 may be applied between the gate and the drain of the operating transistor Q2.

The above inspection can be performed by using the inspection device shown in FIG. 5 by merely changing the potential generated by the inspection potential generating circuit 44.

The present invention is not limited to the above-described embodiment. Various modifications and variations are possible within the spirit and scope of the present invention.

The present invention is described above taking an active matrix substrate for an organic EL display as an example. However, the present invention may be used in other applications insofar as the substrate has an operating transistor having a parasitic capacitor in each pixel.

A P channel transistor may be used as the operating transistor Q2 instead of an N channel transistor. In this case, the parasitic capacitor of the operating transistor Q2 has characteristics in which the parasitic capacitance is in the high-saturation region A at a high voltage and is in the low-saturation region B at a low voltage including a negative voltage, differing from the characteristics shown in FIG. 3. Therefore, the applied voltage may be set taking the characteristics into consideration during charging or sensing.

What is claimed is:

1. An inspection method for an active matrix substrate comprising:
   a first step of providing an active matrix substrate including a plurality of signal lines, a plurality of scanning lines, a plurality of voltage supply lines, and a plurality of pixels, each of the plurality of pixels being connected with one of the signal lines, one of the scanning lines, and one of the voltage supply lines, each of the plurality of pixels including a pixel select transistor connected with the one signal line and the one scanning line and an operating transistor, a gate of the operating transistor being connected with the pixel select transistor, one of a source and a drain of the operating transistor being connected with the one voltage supply line, and the other of the source and the drain of the operating transistor being in an open state;
   a second step of charging a parasitic capacitor between the gate of the operating transistor and the one voltage supply line by supplying a potential from an inspection device;
   a third step of measuring discharge current by using the inspection device when discharging the parasitic capacitor; and
   a fourth step of determining whether or not a defect exists in each of the plurality of pixels by using the inspection device based on a value of the discharge current.

2. The inspection method as defined in claim 1,
wherein each of the plurality of pixels further includes a storage capacitor connected with the gate of the operating transistor, and
wherein an influence of the storage capacitor is canceled in the second step and the third step.

3. The inspection method as defined in claim 2,
wherein a potential difference between opposite ends of the storage capacitor is substantially the same in the second step and the third step.

4. The inspection method as defined in claim 1,
wherein a range of capacitance values of the parasitic capacitor between the gate of the operating transistor and the one voltage supply line has a high-saturation region, a low-saturation region, and a transition region between the high-saturation region and the low-saturation region in which a capacitance value changes depending on an applied voltage, and
wherein a voltage is applied between the gate of the operating transistor and the one voltage supply line in at least one of the second step and the third step, so that a capacitance value of the parasitic capacitor between the gate of the operating transistor and the one voltage supply line is within the high-saturation region.

5. The inspection method as defined in claim 1,
wherein a set of steps consisting of the second to fourth steps is performed a plurality of times while changing a voltage applied between the gate of the operating transistor and the one voltage supply line.

6. The inspection method as defined in claim 5,
wherein a range of capacitance values of the parasitic capacitor between the gate of the operating transistor and the one voltage supply line has a high-saturation region, a low-saturation region, and a transition region between the high-saturation region and the low-saturation region in which a capacitance value changes depending on an applied voltage, and
wherein a voltage is applied between the gate of the operating transistor and the one voltage supply line in at least one of the second step and the third step performed in the set, so that a capacitance value of the parasitic capacitor between the gate of the operating transistor and the one voltage supply line is within the transition region.

7. The inspection method as defined in claim 5,
wherein a range of capacitance values of the parasitic capacitor between the gate of the operating transistor and the one voltage supply line has a high-saturation region, a low-saturation region, and a transition region between the high-saturation region and the low-saturation region in which a capacitance value changes depending on an applied voltage,
wherein a voltage is applied between the gate of the operating transistor and the one voltage supply line in at least one of the second step and the third step in an initial performance of the set, so that a capacitance value of the parasitic capacitor between the gate of the operating transistor and the one voltage supply line is within the high-saturation region, and
wherein a voltage is applied between the gate of the operating transistor and the one voltage supply line in at least one of the second step and the third step in the set performed after the initial performance of the set, so that a capacitance value of the parasitic capacitor between the gate of the operating transistor and the one voltage supply line is within the transition region.

8. The inspection method as defined in claim 7,
wherein a pixel which is determined to be normal in the fourth step in the initial performance of the set is determined in the fourth step in the set performed after the initial performance of the set.

9. The inspection method as defined in claim 1,
wherein a charge operation is performed for pixels arranged in line among the plurality of pixels by sequentially setting the scanning lines at an active potential in the second step, the pixels arranged in line being connected with each of the scanning lines, and
wherein, when all the plurality of pixels have been charged, a discharge operation is performed for the pixels arranged in line connected with each of the scanning lines by sequentially setting the scanning lines at the active potential in the third step.

10. The inspection method as defined in claim 9,
wherein the pixels arranged in line are driven by a point-at-a-time scanning by sequentially connecting the signal lines connected with the pixels arranged in line with the inspection device in the second step and the third step.

11. The inspection method as defined in claim 9,
wherein a vertical driver circuit which selectively drives the scanning lines and a horizontal driver circuit which selectively drives the signal lines are provided on the active matrix substrate, and
wherein the plurality of pixels are driven based on functions of the vertical driver circuit and the horizontal driver circuit in the second step and the third step.

12. An inspection method for an active matrix substrate comprising:
a first step of providing an active matrix substrate including a plurality of signal lines, a plurality of scanning lines, a plurality of voltage supply lines, and a plurality of pixels, each of the plurality of pixels being connected with one of the signal lines, one of the scanning lines, and one of the voltage supply lines, each of the plurality of pixels including a pixel select transistor connected with the one signal line and the one scanning line, an operating transistor, and a storage capacitor, a gate of the operating transistor being connected with the storage capacitor and the pixel select transistor, one of a source and a drain of the operating transistor being connected with the one voltage supply line, and the other of the source and the drain of the operating transistor being in an open state;
a second step of charging the storage capacitor by supplying a potential from an inspection device;
a third step of measuring discharge current from the storage capacitor by using the inspection device when discharging the storage capacitor; and
a fourth step of determining whether or not a defect exists in each of the plurality of pixels by using the inspection device based on a value of the discharge current,
wherein an influence of a parasitic capacitor between the gate of the operating transistor and the one voltage supply line is canceled in the second step and the third step.

13. The inspection method as defined in claim 12,
wherein a potential difference between the gate of the operating transistor and the one voltage supply line is substantially the same in the second step and the third step.

14. The inspection method as defined in claim 13,
wherein a range of capacitance values of the parasitic capacitor between the gate of the operating transistor and the one voltage supply line has a high-saturation region, a low-saturation region, and a transition region between the high-saturation region and the low-saturation region in which a capacitance value changes depending on an applied voltage, and
wherein a voltage is applied between the gate of the operating transistor and the one voltage supply line in the second step and the third step, so that a capacitance value of the parasitic capacitor between the gate of the operating transistor and the one voltage supply line is within the low-saturation region.

15. The inspection method as defined in claim 12,
wherein a charge operation is performed for pixels arranged in line among the plurality of pixels by sequentially setting the scanning lines at an active potential in the second step, the pixels arranged in line being connected with each of the scanning lines, and
wherein, when all the plurality of pixels have been charged, a discharge operation is performed for the pixels arranged in line connected with each of the scanning lines by sequentially setting the scanning lines at the active potential in the third step.

16. The inspection method as defined in claim 15,
wherein the pixels arranged in line are driven by a point-at-a-time scanning by sequentially connecting the signal lines connected with the pixels arranged in line with the inspection device in the second step and the third step.

17. The inspection method as defined in claim 15,
wherein a vertical driver circuit which selectively drives the scanning lines and a horizontal driver circuit which selectively drives the signal lines are provided on the active matrix substrate, and
wherein the plurality of pixels are driven based on functions of the vertical driver circuit and the horizontal driver circuit in the second step and the third step.

18. An inspection device for an active matrix substrate including a plurality of signal lines, a plurality of scanning lines, a plurality of voltage supply lines, and a plurality of pixels, each of the plurality of pixels being connected with one of the signal lines, one of the scanning lines, and one of the voltage supply lines, each of the plurality of pixels including a pixel select transistor connected with the one signal line and the one scanning line and an operating transistor, a gate of the operating transistor being connected with the pixel select transistor, one of a source and a drain of the operating transistor being connected with the one voltage supply line, and the other of the source and the drain of the operating transistor being in an open state, the inspection device comprising:
an inspection potential generating circuit which generates inspection potentials supplied to the scanning lines and the voltage supply lines;
a charge-sense circuit connected with the signal lines;
a timing signal generating circuit which generates a timing signal for driving the scanning lines, the signal lines, and the voltage supply lines; and
a determining circuit which determines whether or not a defect exists in each of the plurality of pixels based on an output from the charge-sense circuit,
wherein the inspection potential generating circuit and the charge-sense circuit supply potentials to charge a parasitic capacitor between the gate of the operating transistor and the one voltage supply line in a charging period, supply potentials to discharge the parasitic capacitor in a sensing period, and measure discharge current from the parasitic capacitor by using the charge-sense circuit in the sensing period.

19. The inspection device as defined in claim 18, wherein the active matrix substrate further includes a plurality of common lines, each of the plurality of pixels further including a storage capacitor connected between the gate of the operating transistor and one of the common lines, wherein the inspection potential generating circuit supplies an inspection potential also to the common lines, and wherein the inspection potential generating circuit and the charge-sense circuit supply potentials, so that a potential difference between opposite ends of the storage capacitor is substantially the same both in the charging period and the sensing period.

20. The inspection device as defined in claim 18, wherein a range of capacitance values of the parasitic capacitor between the gate of the operating transistor and the one voltage supply line has a high-saturation region, a low-saturation region, and a transition region between the high-saturation region and the low-saturation region in which a capacitance value changes depending on an applied voltage, and wherein the inspection potential generating circuit and the charge-sense circuit apply a voltage between the gate of the operating transistor and the one voltage supply line in at least one of the charging period and the sensing period, so that a capacitance value of the parasitic capacitor between the gate of the operating transistor and the one voltage supply line is within the high-saturation region.

21. The inspection device as defined in claim 18, wherein a range of capacitance values of the parasitic capacitor between the gate of the operating transistor and the one voltage supply line has a high-saturation region, a low-saturation region, and a transition region between the high-saturation region and the low-saturation region in which a capacitance value changes depending on an applied voltage, and wherein the inspection potential generating circuit and the charge-sense circuit apply a voltage between the gate of the operating transistor and the one voltage supply line in at least one of the charging period and the sensing period, so that a capacitance value of the parasitic capacitor between the gate of the operating transistor and the one voltage supply line is within the transition region.

22. The inspection device as defined in claim 18, wherein a vertical driver circuit which selectively drives the scanning lines and a horizontal driver circuit which selectively drives the signal lines are provided on the active matrix substrate, and wherein the timing signal generating circuit supplies a timing signal to the vertical driver circuit and the horizontal driver circuit to make a charge operation and a sense operation to be performed based on functions of the vertical driver circuit and the horizontal driver circuit.

23. An inspection device for an active matrix substrate including a plurality of signal lines, a plurality of scanning lines, a plurality of voltage supply lines, and a plurality of pixels, each of the plurality of pixels being connected with one of the signal lines, one of the scanning lines, and one of the voltage supply lines, each of the plurality of pixels including a pixel select transistor connected with the one signal line and the one scanning line, an operating transistor, and a storage capacitor, a gate of the operating transistor being connected with one end of the storage capacitor and the pixel select transistor, one of a source and a drain of the operating transistor being connected with the one voltage supply line, the other of the source and the drain of the operating transistor being in an open state, and one of a plurality of common lines being connected with the other end of the storage capacitor, the inspection device comprising:

an inspection potential generating circuit which generates inspection potentials supplied to the scanning lines, the voltage supply lines, and the common lines;

a charge-sense circuit connected with the signal lines;

a timing signal generating circuit which generates a timing signal for driving the scanning lines, the signal lines, the voltage supply lines, and the common lines; and a determining circuit which determines whether or not a defect exists in each of the plurality of pixels based on an output from the charge-sense circuit, wherein the inspection potential generating circuit and the charge-sense circuit supply potentials to charge the storage capacitor in a charging period, supply potentials to discharge the storage capacitor in a sensing period, supply potentials to cancel an influence of a parasitic capacitor between the gate of the operating transistor and the one voltage supply line in the charging period and a sensing period, and measure discharge current from the storage capacitor by using the charge-sense circuit in the sensing period.

24. The inspection device as defined in claim 23, wherein a vertical driver circuit which selectively drives the scanning lines and a horizontal driver circuit which selectively drives the signal lines are provided on the active matrix substrate, and wherein the timing signal generating circuit supplies a timing signal to the vertical driver circuit and the horizontal driver circuit to make a charge operation and a sense operation to be performed based on functions of the vertical driver circuit and the horizontal driver circuit.

25. A program for inspecting an active matrix substrate including a plurality of signal lines, a plurality of scanning lines, a plurality of voltage supply lines, and a plurality of pixels, each of the plurality of pixels being connected with one of the signal lines, one of the scanning lines, and one of the voltage supply lines, each of the plurality of pixels including a pixel select transistor connected with the one signal line and the one scanning line and an operating transistor, a gate of the operating transistor being connected with the pixel select transistor, one of a source and a drain of the operating transistor being connected with the one voltage supply line, and the other of the source and the drain of the operating transistor being in an open state, the program for causing a computer to perform the procedures comprising:

a first procedure of charging a parasitic capacitor between the gate of the operating transistor and the one voltage supply line;

a second procedure of measuring discharge current from the parasitic capacitor by discharging the parasitic capacitor; and a third procedure of determining whether or not a defect exists in each of the plurality of pixels based on a value of the discharge current.

26. A computer-readable information storage medium storing the program as defined in claim 25 is recorded.

27. A program for an active matrix substrate for inspecting an active matrix substrate including a plurality of signal lines, a plurality of scanning lines, a plurality of voltage supply lines, and a plurality of pixels, each of the plurality of pixels being connected with one of the signal lines, one of the scanning lines, and one of the voltage supply lines, each of the plurality of pixels including a pixel select transistor connected with the one signal line and the one scanning line, an operating transistor, and a storage capacitor, a gate of the operating transistor being connected with one end of the storage capacitor and the pixel select transistor, one of a source and a drain of the operating transistor being connected with the one voltage supply line, the other of the source and the drain of the operating transistor being in an open state, and one of a plurality of common lines being connected with the other end of the storage capacitor, the program for causing a computer to perform the procedures comprising:

a first procedure of charging the storage capacitor;

a second procedure of measuring discharge current from the storage capacitor by discharging the storage capacitor; and a third procedure of determining whether or not a defect exists in each of the plurality of pixels based on a value of the discharge current, wherein the program also causes the computer to cancel an influence of a parasitic capacitor between the gate of the operating transistor and the one voltage supply line in the first procedure and the second procedure.

28. A computer-readable information storage medium storing the program as defined in claim 27 is recorded.

* * * * *